US011986029B2

(12) United States Patent
Hirschmann, Jr.

(10) Patent No.: US 11,986,029 B2
(45) Date of Patent: May 21, 2024

(54) COAT WITH INTEGRAL DRAG HARNESS

(71) Applicant: Paramount Corporation, North Dartmouth, MA (US)

(72) Inventor: Jack B Hirschmann, Jr., North Dartmouth, MA (US)

(73) Assignee: Paramount Corporation

( * ) Notice: Subject to any disclaimer, the term of this patent is extended or adjusted under 35 U.S.C. 154(b) by 0 days.

(21) Appl. No.: 17/495,950

(22) Filed: Oct. 7, 2021

(65) Prior Publication Data

US 2022/0110377 A1 Apr. 14, 2022

Related U.S. Application Data

(60) Provisional application No. 63/198,278, filed on Oct. 8, 2020.

(51) Int. Cl.
*A41D 13/00* (2006.01)
*A41D 3/02* (2006.01)
*A62B 35/00* (2006.01)

(52) U.S. Cl.
CPC ........... *A41D 13/0007* (2013.01); *A41D 3/02* (2013.01); *A62B 35/0037* (2013.01)

(58) Field of Classification Search
CPC .. A41D 13/0007; A62B 35/00; A62B 35/0037
See application file for complete search history.

(56) References Cited

U.S. PATENT DOCUMENTS

| | | | | |
|---|---|---|---|---|
| 2,979,153 A | | 4/1961 | Hoagland et al. | |
| 3,077,292 A | * | 2/1963 | Gehrke | A01M 31/006 119/857 |
| 4,177,877 A | * | 12/1979 | Gallinati | E04G 21/3261 2/96 |
| 4,731,882 A | * | 3/1988 | Ekman | A41D 13/0007 2/69 |
| 4,854,418 A | | 8/1989 | Hengstenberger et al. | |
| 5,960,480 A | * | 10/1999 | Neustater | A62B 35/04 2/456 |
| 6,101,631 A | * | 8/2000 | Ferguson, Jr. | A41D 13/0007 2/108 |
| 6,128,782 A | * | 10/2000 | Young | A62B 35/0018 244/151 R |
| 6,205,584 B1 | | 3/2001 | Yocco | |

(Continued)

FOREIGN PATENT DOCUMENTS

| | | | | | |
|---|---|---|---|---|---|
| EP | 1561492 A2 | | 8/2001 | | |
| GB | 2435400 A | * | 8/2007 | | A41D 11/00 |

*Primary Examiner* — Alissa L Hoey

(74) *Attorney, Agent, or Firm* — Norton Rose Fulbright Canada LLP; Maya Medeiros

(57) ABSTRACT

A coat with an integrated drag harness. The harness is a single strip of material, such as a flat webbing or rope that extends through a slit in the center of the back of the coat torso below the neck opening. Inside the torso, the strip is a yoke that follows a path that runs from the slit, around one arm hole, across the slit, around the other arm hole, and ending at the slit. The yoke is secured to the torso by stitching. The strip extends a length outside of the slit to form a strap that is at least is four feet long. Optionally, the end of the strap has a handle. Optionally, the strap is stored in a pocket in the back of the torso.

19 Claims, 10 Drawing Sheets

(56) References Cited

U.S. PATENT DOCUMENTS

| | | | | |
|---|---|---|---|---|
| 6,256,789 | B1 * | 7/2001 | Young | E04G 5/001 244/151 R |
| 6,698,026 | B2 * | 3/2004 | Schweer | A41D 13/0007 2/108 |
| 7,356,850 | B2 | 4/2008 | Turcotte et al. | |
| 7,451,495 | B2 * | 11/2008 | Munn | A62B 35/00 2/311 |
| 7,571,494 | B2 * | 8/2009 | Grilliot | A62B 35/0037 2/69 |
| 7,594,281 | B1 * | 9/2009 | Stinson | A62B 17/003 2/310 |
| 7,665,152 | B2 * | 2/2010 | Sloan | A62B 17/00 2/69 |
| 7,779,484 | B2 * | 8/2010 | Fee | A62B 17/003 2/69 |
| 8,015,619 | B2 * | 9/2011 | McKay | A62B 35/0006 2/69 |
| 8,091,151 | B2 * | 1/2012 | Johnson | A62B 35/0018 2/455 |
| 8,332,964 | B2 * | 12/2012 | Helwig | A41D 15/04 2/69.5 |
| 8,375,467 | B2 * | 2/2013 | Real | A62B 35/0018 2/69 |
| 8,430,204 | B1 | 4/2013 | Reynolds | |
| 8,651,234 | B2 * | 2/2014 | Yocco | A62B 35/0018 182/3 |
| 8,678,134 | B2 * | 3/2014 | Wood | A62B 35/04 182/5 |
| 8,776,266 | B1 * | 7/2014 | Metz | A41D 13/0007 2/93 |
| 9,392,860 | B2 * | 7/2016 | Redli | A41D 3/00 |
| 9,855,450 | B2 * | 1/2018 | Remler | A62B 35/0018 |
| 10,456,609 | B2 * | 10/2019 | Yang | A62B 35/0075 |
| 10,485,274 | B2 * | 11/2019 | Allen | A62B 17/003 |
| 10,898,740 | B2 * | 1/2021 | McKay | A62B 35/0018 |
| 10,918,140 | B2 * | 2/2021 | Harrison | A41D 3/00 |
| 11,129,423 | B2 * | 9/2021 | Zeppetella | A41D 13/0007 |
| D940,999 | S * | 1/2022 | Moreau | D2/840 |
| 2005/0173188 | A1 | 8/2005 | Lewis et al. | |
| 2005/0211188 | A1 | 9/2005 | Grilliot et al. | |
| 2007/0023231 | A1 * | 2/2007 | Gorman | A62B 35/0025 182/3 |
| 2007/0199135 | A1 | 8/2007 | Grilliot et al. | |
| 2008/0164095 | A1 | 7/2008 | Snedeker | |
| 2008/0256680 | A1 | 10/2008 | Peksoz et al. | |
| 2008/0289083 | A1 | 11/2008 | Grilliot et al. | |
| 2009/0236176 | A1 * | 9/2009 | Sheu | A62B 35/0018 2/69 |
| 2011/0030118 | A1 | 2/2011 | Pratchet | |
| 2015/0359272 | A1 * | 12/2015 | Murphy | A41D 13/0007 2/69 |
| 2016/0278454 | A1 * | 9/2016 | Lucas | A41D 13/0007 |
| 2019/0216142 | A1 * | 7/2019 | Zeppetella | A62B 35/0037 |
| 2020/0060357 | A1 * | 2/2020 | Duran | A41D 1/02 |
| 2021/0000192 | A1 * | 1/2021 | Rutten | A62B 35/0025 |
| 2022/0061416 | A1 * | 3/2022 | Zeppetella | A41D 13/0007 |

* cited by examiner

COAT WITH INTEGRAL DRAG HARNESS

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to safety garments, more particularly, to coats, coveralls, and the like with drag harnesses.

2. Description of the Related Art

Workers can find themselves in dangerous situations, and it is not uncommon for them to become incapacitated or immobilized. It is desirable that an incapacitated worker be removed from the dangerous situation so that they are not exposed to any further harm. This commonly involves dragging or pulling the individual from the location of danger.

BRIEF SUMMARY OF THE INVENTION

The present invention is a coat or other garment that has a drag harness integrated therewith. A coat suitable the present invention has a torso composed of one or more layers of fabric material. The torso has a back with an inner surface and an outer surface. The coat two arm holes in the torso and a neck opening. The torso opens in the front with a closure.

The harness is composed of a single strip of material strong enough to drag or pull a large man with extra weight from attached equipment. The strip can be any elongated construction with the appropriate characteristics for the application. In one configuration, the strip is a flat webbing. In another configuration, the strip is a rope, that is, a twisted or braided construction with a generally round cross-section.

The strip extends through a vertical or horizontal slit between the inner surface and outer surface. The slit is located three to ten inches below the neck opening and in the center of the back.

Inside the torso, the strip is a yoke that follows a path that runs from the slit, around one of the arm holes, across the slit, around the other arm hole, and ending at the slit. There are three layers of the yoke at the slit. The bottom layer is the yoke coming through the slit, the middle layer is the yoke crossing the slit, and the top layer is the secured end of the yoke. The layers at the slit are sewn to the coat so that the yoke maintains its attachment to the coat when in use. The yoke is secured to the torso, typically by stitching.

The strip extends a length outside of the slit to form a strap that is at least is four feet long. Optionally, the free end of the strap has a handle, such as a loop in the strap, a knob, or a ring.

Optionally, the back has a pocket for the storing the strap. In one configuration, the pocket is a patch sewn to the outer surface. In another configuration, the pocket is a patch sewn to the inner surface and accessed by a slot in the back. In another configuration, the pocket is a pouch hanging from and accessed by a slot in the back.

Objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present application hereby incorporates by reference in its entirety U.S. Provisional Patent Application No. 63/198,278, from which benefit is claimed.

The present invention is a jacket, coat, overall, coverall, or other garment with armholes that has a drag harness integrated therewith. The term “coat” is used herein to refer to the garment and is intended to cover any garment with which the harness can be integrated.

Figure 1:
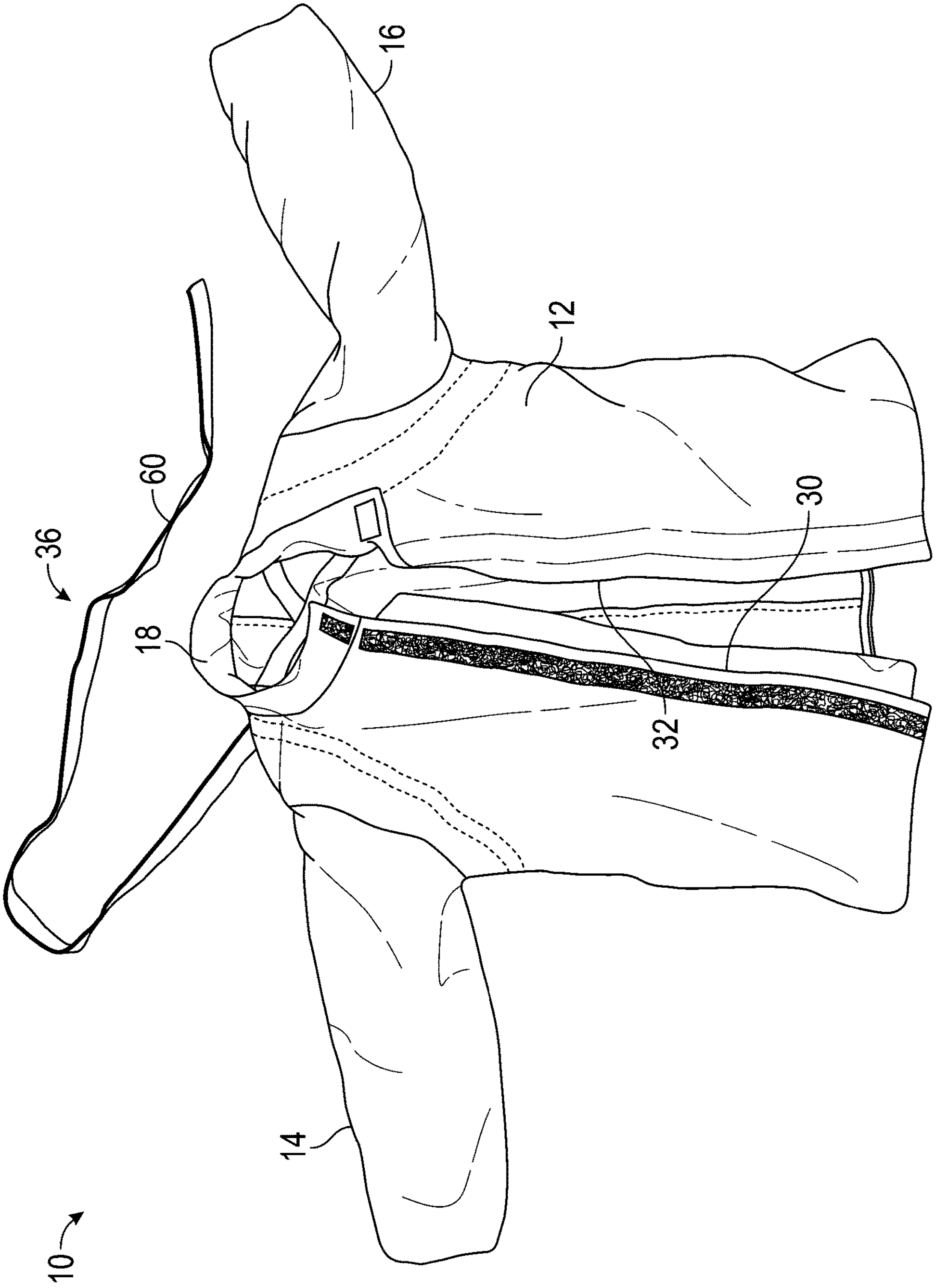
FIG. 1 is a front view of a closed coat incorporating a harness of the present invention.
Figure 2:
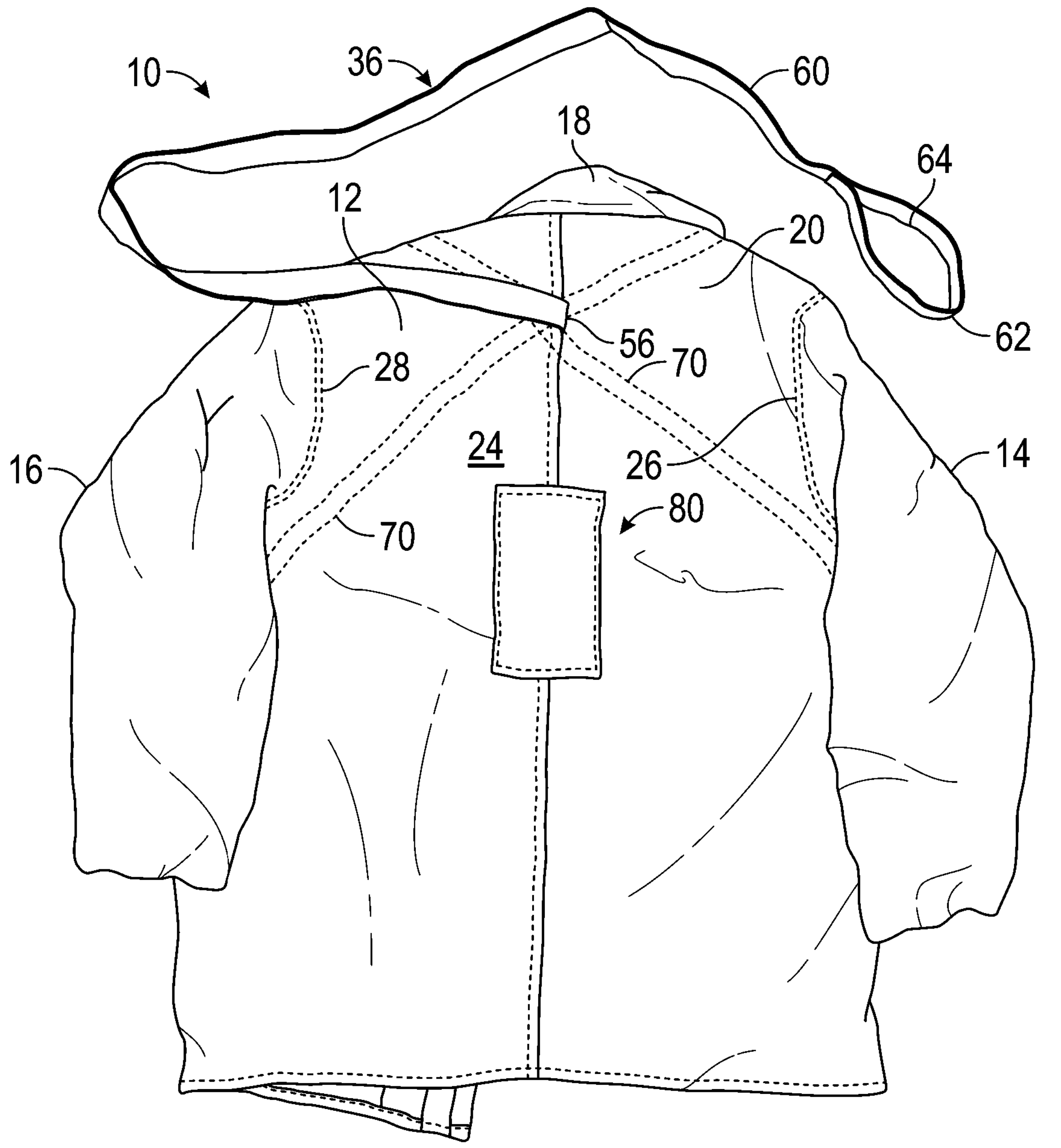
FIG. 2 is a back view of the coat incorporating several features.
Figure 3:
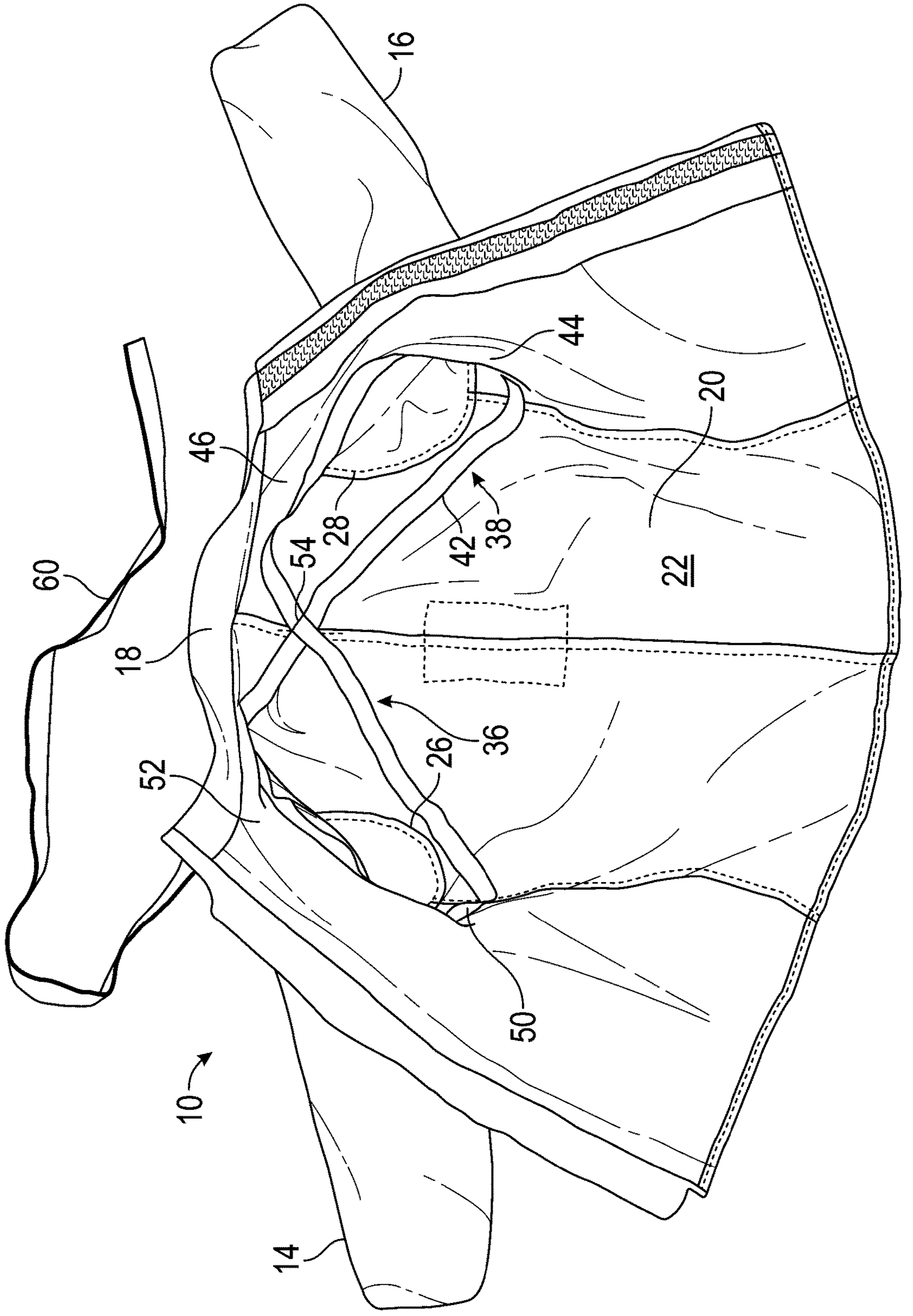
FIG. 3 is an inside view of the coat incorporating the harness of the present invention.

FIGS. 1-3 show a typical coat 10 that is suitable for use in the present invention. The coat 10 has a torso 12 composed of one or more layers of fabric material. The torso 12 has a back 20 and the back 20 has an inner surface 22 and an outer surface 24. The coat 10 has two sleeves 14, 16 sewn onto arm holes 26, 28 in the torso 12, and a neck opening 18 with an optional collar. The coat 10 may not have sleeves 14, 16 if it is designed as a vest. The torso 12 opens in the front with a closure 30, typically a zipper, under an optional front flap 32.

The coat is composed of materials that are appropriate for the application. For a coat designed to work where there are electrical hazards, the preferred material is non-electrically-conductive. For a coat designed to work where there is a potential for fire, the preferred material is self-extinguishing. Materials for particular applications are well-known in the art.

The harness 36 is composed of a single strip 38 of material. The preferred material is strong enough to drag or pull a large man with extra weight from tools and other attached equipment, such as 300 pounds. The strip 38 can be any elongated construction that has the appropriate above-described characteristics for the application. In one configuration, the strip 38 is a flat webbing. A suitable width for the webbing is in the range of from 0.375 to 1.0 inch and a suitable thickness is in the range of from 0.0625 to 0.25 inch.

In another configuration, the strip 38 is a rope, that is, a twisted or braided construction with a generally round cross-section. A suitable diameter for the rope is in the range of from 0.25 to 0.5 inch. The rope can have a tight twist or braid so that it substantially maintains its cross-sectional shape. Alternatively, the rope can have a loose twist or braid so that it flattens under radial pressure. A suitable width for such a flattened rope is in the range of from 0.375 to 1.0 inch and a suitable thickness is in the range of from 0.0625 to 0.25 inch.

Figure 10:
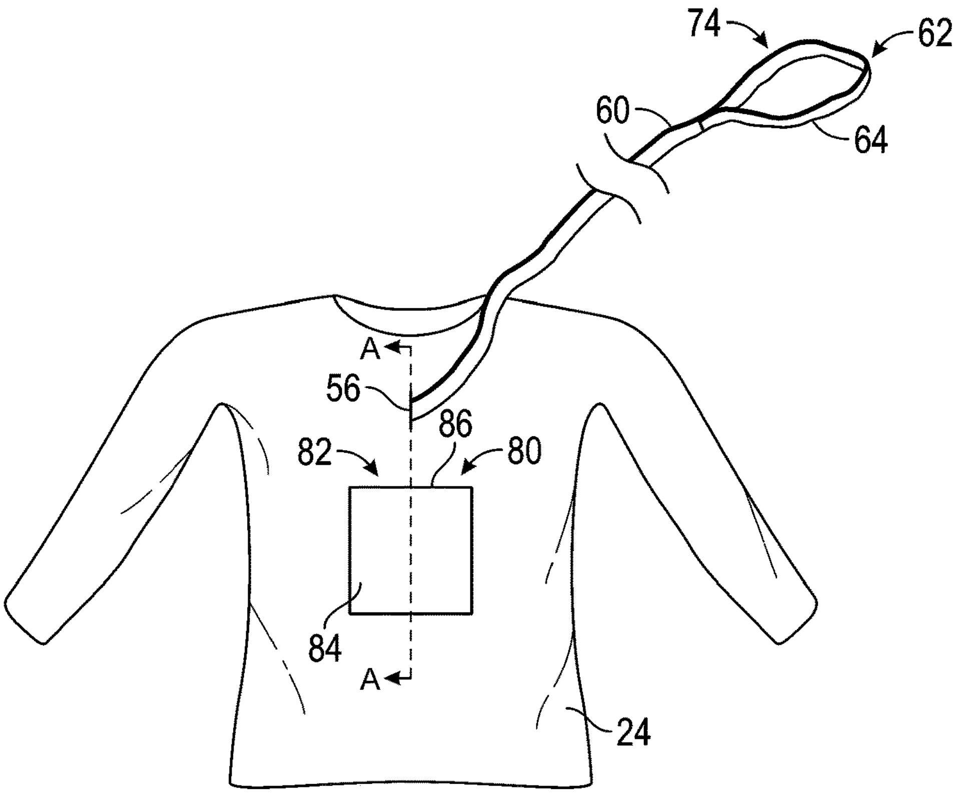
FIG. 10 is a back view of the coat showing several variations.

The strip 38 extends through a slit 56 between the inner surface 22 and outer surface 24 of the torso back 20. The slit 56 can be vertical, as in FIG. 10, or horizontal, as in FIG. 12. The slit 56 is slightly longer than the width of the strip 38.

The slit 56 is located three to ten inches below the neck opening 18 and in the center of the back 20 of the torso 12. The slit 56 must be high enough on the back so that the coat 10 is not pulled up the wearer's back when being dragged or pulled by the harness 10.

Inside the torso 12, the strip 38 is a yoke 42 that follows a path 40 that surrounds the arm holes 26, 28. In general, the path 40 of the yoke 42 runs from the slit 56, around one of the arm holes 26, 28, across the slit 56, around the other arm hole 26, 28, ending at the slit 56.

Figure 4:
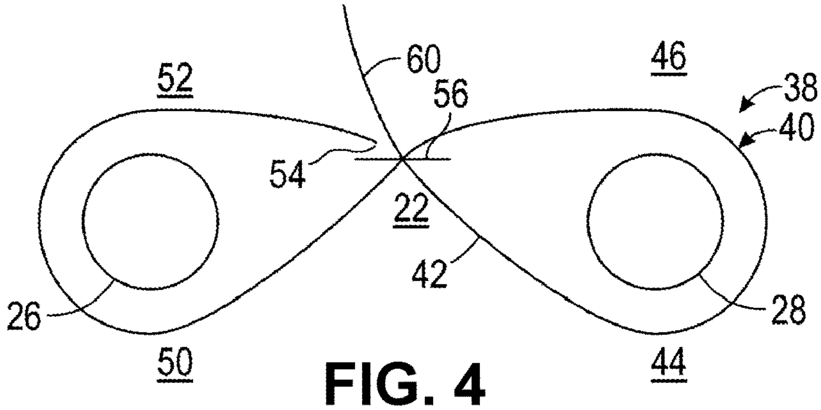
FIG. 4 is an inside view of the coat showing the first yoke path.

More specifically, the yoke 42 can take one of four different paths. In a first configuration, shown in FIG. 4, the path 40 of the yoke 42 runs from the slit 56 toward the left armpit 44, looping upwardly around the front of the left arm hole 28 to the left shoulder 46, crossing the slit 56, to the right armpit 50, looping upwardly around the front of the right arm hole 26 to the right shoulder 52, and back to the slit 56.

Figure 5:
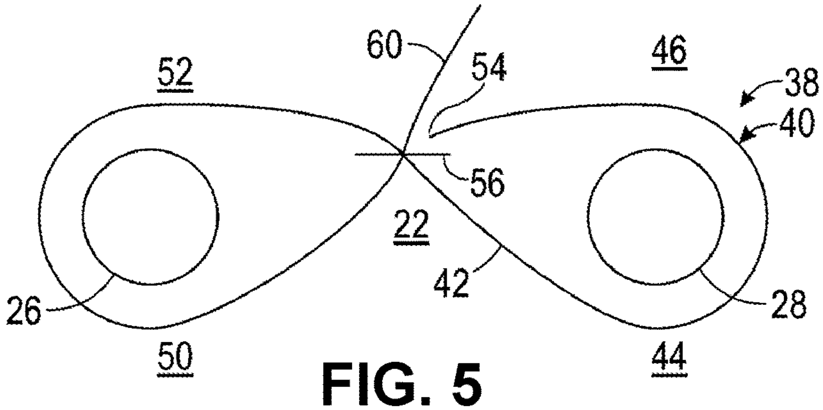
FIG. 5 is an inside view of the coat showing the second yoke path.

In a second configuration, shown in FIG. 5, the path 40 of the yoke 42 runs from the slit 56 toward the right armpit 50, looping upwardly around the front of the right arm hole 26 to the right shoulder 52, crossing the slit 56, to the left armpit 44, looping upwardly around the front of the left arm hole 28 to the left shoulder 46, and back to the slit 56.

Figure 6:
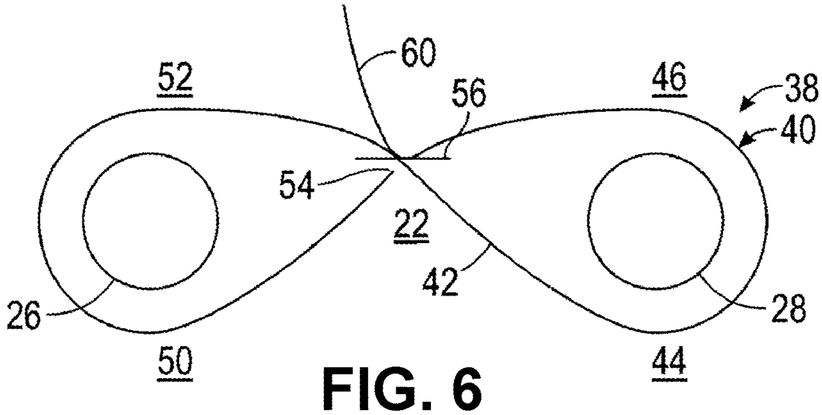
FIG. 6 is an inside view of the coat showing the third yoke path.

In a third configuration, shown in FIG. 6, the path 40 of the yoke 42 runs from the slit 56 toward the left shoulder 46, looping downwardly around the front of the left arm hole 28 to the left armpit 44, crossing the slit 56, to the right shoulder 52, looping downwardly around the front of the right arm hole 26 to the right armpit 50, and back to the slit 56.

Figure 7:
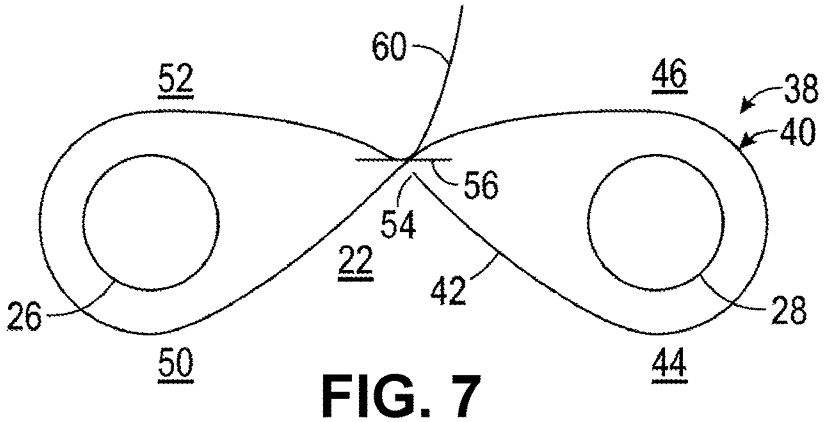
FIG. 7 is an inside view of the coat showing the fourth yoke path.

In a fourth configuration, shown in FIG. 7, the path 40 of the yoke 42 runs from the slit 56 toward the right shoulder 52, looping downwardly around the front of the right arm hole 26 to the right armpit 50, crossing the slit 56, to the left shoulder 46, looping downwardly around the front of the left arm hole 28 to the left armpit 44, and back to the slit 56.

In all four configurations, there are three layers of the yoke 42 at the slit 56. The bottom, inner-most layer is the yoke 42 coming through the slit 56. The middle layer is the yoke 42 crossing the slit 56 going from one arm hole to the other. The top, outer-most layer is the secured end 54 of the yoke 42. The layers of the yoke 42 at the slit 56 are sewn to the coat 10 such that, when the wearer is being pulled by the harness 36, the yoke 42 maintains its attachment to the coat 10. Optionally, there is stitching adjacent to the slit 56 where the yoke 42 comes through in order to reinforce the attachment of the yoke 42 to the torso 12.

The yoke 42 on the path 40 is secured to the torso 12. If the yoke 42 is flat, as in a flat webbing or a flattened rope, the edges of the yoke 42 are sewn to the torso 12, as at 70 in FIG. 2. If the yoke 42 is a tight rope, the yoke 42 is sewn to the torso 12 by stitching through the rope or over the rope.

In one configuration, the entire length of the yoke 42 is sewn to the torso 12. In another configuration, sections of the length of the yoke 42 are sewn to the torso 12.

Figure 8:
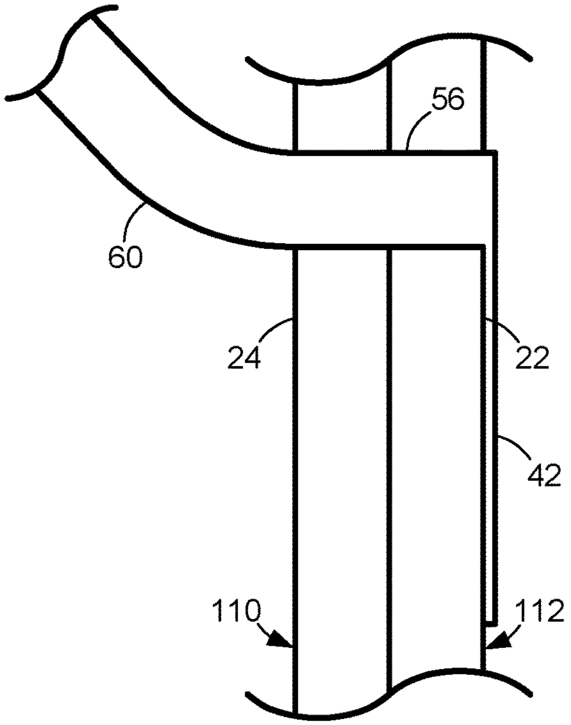
FIG. 8 is a cross-sectional, side view of the torso back with the inner surface on the liner.
Figure 9:
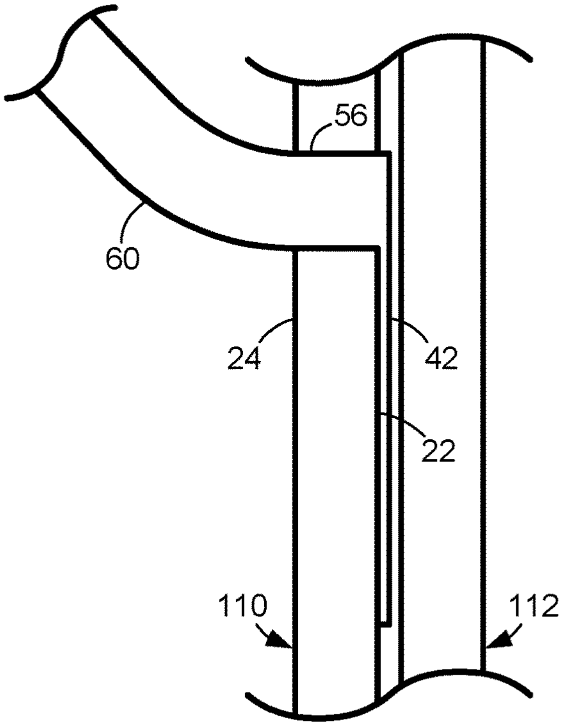
FIG. 9 is a cross-sectional, side view of the torso back with the inner surface on the outer layer.

As described above, the torso 12 can be constructed of one or more layers of material. The inner surface 22 to which the yoke 42 is secured can be on the inside of the inner-most layer or the inner surface 22 can be on the inside of one of the other layers. For example, with a coat 10 that has an outer layer 110 composed of a robust material and a liner 112 composed of a softer material, the inner surface 22 can be the inside of the liner 112, as in FIGS. 3 and 8, or can be the inside of the outer layer 110, as in FIG. 9. In the latter configuration, the yoke 42 would not be visible because it is covered by the liner 112.

The strip 38 extends a length outside of the slit 56 to form a strap 60. The minimum length of the strap 60 depends on the situations for which the coat is intended. Typically, the minimum length is four feet, but will usually be six feet long.

Optionally, the free end 62 of the strap 60 has a handle 74. In one configuration, shown in FIG. 10, the handle 74 is a loop 64 formed at the free end 62. The minimum diameter of the loop 64 is large enough to be quickly grabbed by a hand. The loop 64 cannot be so large that it adds superfluous material to the strap 60. Preferably, the diameter of the loop 64 is in the range of from five inches to ten inches.

Figure 12:
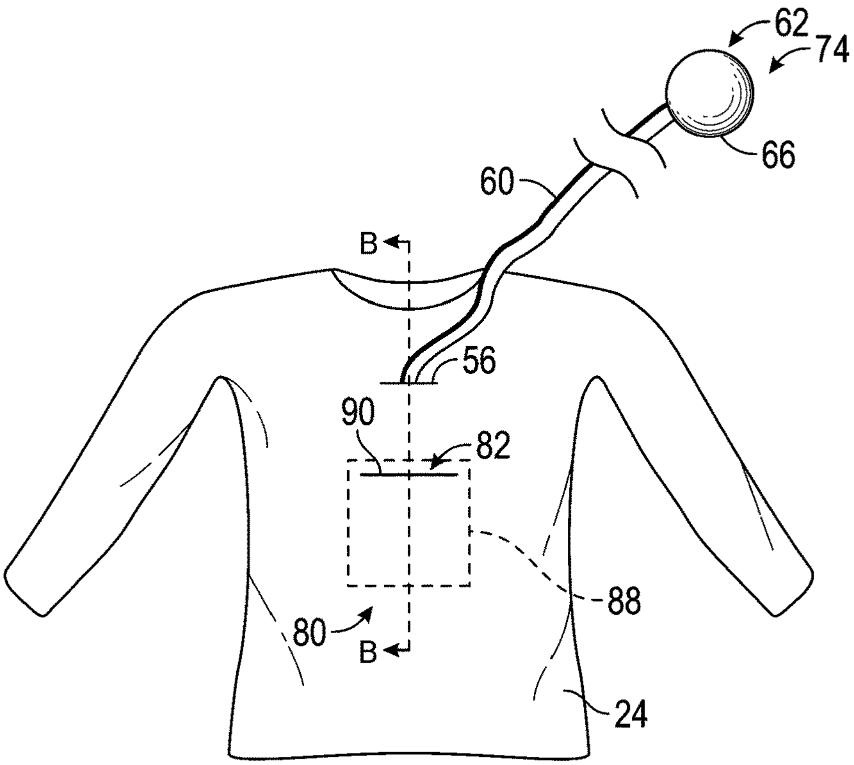
FIG. 12 is a back view of the coat showing several variations.

In another configuration, shown in FIG. 12, the handle 74 is a knob 66 at the free end 62 of the strap 60. The knob 66 is a generally spherical or ovoid shape that can be easily gripped by the hand. Alternatively, the knob 66 is formed by folding the strap end 62 many times or rolling the strap 60 into a ball and sewing such that a section significantly larger than the strap 60 is formed. Alternatively, the knob 66 is formed by tying the strap end 62 in a knot that is significantly larger than the strap 60. The advantage of a knob 66 over a loop 64 is that the rescuer can grab anywhere on the strap 60 and slide the hand down the strap 60 until it reaches the knob 66.

Figure 14:
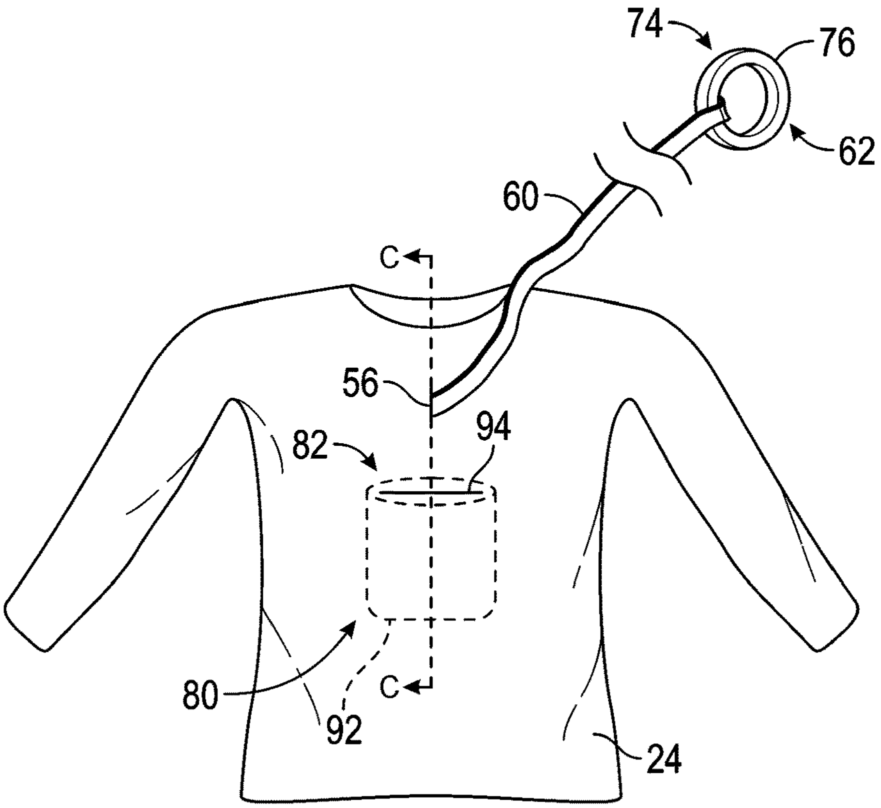
FIG. 14 is a back view of the coat showing several variations.

In another configuration, shown in FIG. 14, the handle 74 is a ring 76 attached at the free end 62. The minimum diameter of the ring 76 is large enough to be quickly grabbed by a hand. Preferably, the inside diameter of the ring 76 is in the range of from five inches to ten inches.

Figure 11:
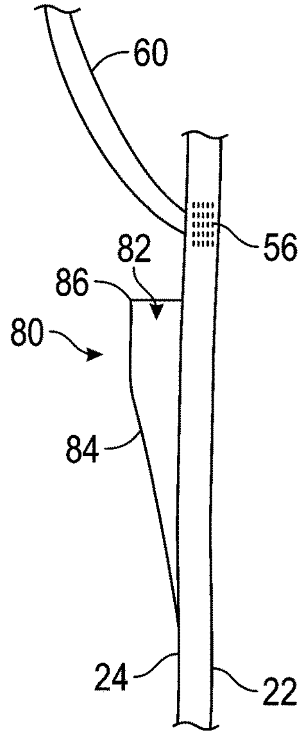
FIG. 11 is a side, cross-sectional view of the configuration of FIG. 10 taken at A-A.

Optionally, the back 20 has a pocket 80 for the strap 60 with an opening 82 at the top. In a first configuration, shown in FIGS. 2, 10, and 11, a patch 84 of material is sewn to the outer surface 24 of the torso 12. The pocket 80 is formed between the patch 84 and the torso outer surface 24. The top edge 86 of the patch 84 is free so as to form the opening 82.

Figure 13:
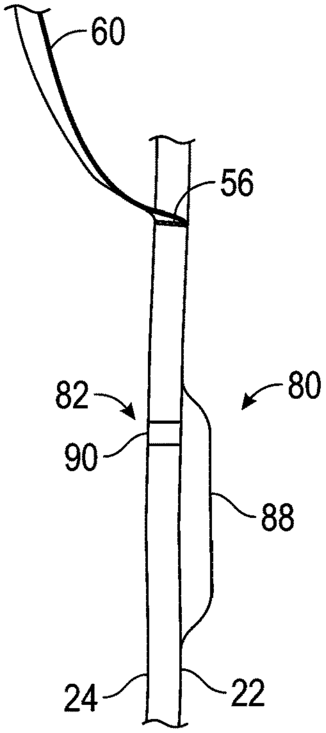
FIG. 13 is a side, cross-sectional view of the configuration of FIG. 12 taken at B-B.

In a second configuration, shown in FIGS. 12 and 13, a patch of material 88 is sown to the inner surface 22 of the torso 12. The patch 88 is sown around the entire perimeter to form the pocket 80 between the patch 88 and torso inner surface 22. The opening 82 is a horizontal slot 90 in the torso 12 extending between the inner surface 22 and the outer surface 24 at the top of the pocket 80. Optionally, the horizontal slot 90 is reinforced.

Figure 15:
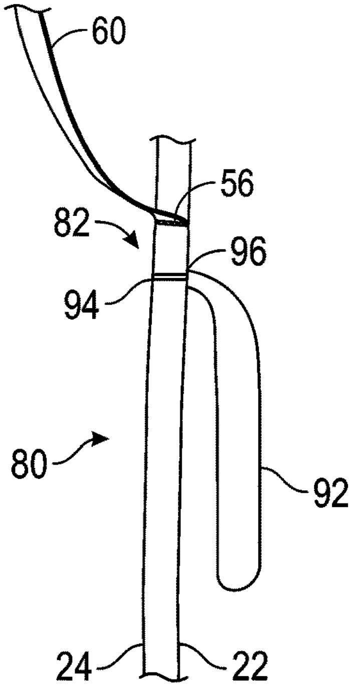
FIG. 15 is a side, cross-sectional view of the configuration of FIG. 14 taken at C-C.

In a third configuration, shown in FIGS. 14 and 15, the pocket 80 is a pouch 92 hanging inside the torso 12. The open top 96 of the pouch 92 is sown to the inner surface 22 around a horizontal slot 94 in the torso 12 extending between the inner surface 22 and the outer surface 24 and the pouch 92 hangs below the horizontal slot 94. The horizontal slot 94 is the opening 82 that provides access to the pocket 80. As with the yoke 42 above, the pouch 92 can be located inside the inner-most layer of the torso 12, as in FIG. 15, or between layers of the torso 12.

The pocket 80 is large enough to hold the strap 60 when it is rolled or folded up. The pocket 80 is small enough that the strap 60 is held so that it will not come out until it is pulled out by the end 62 of the strap 60.

Figure 16:
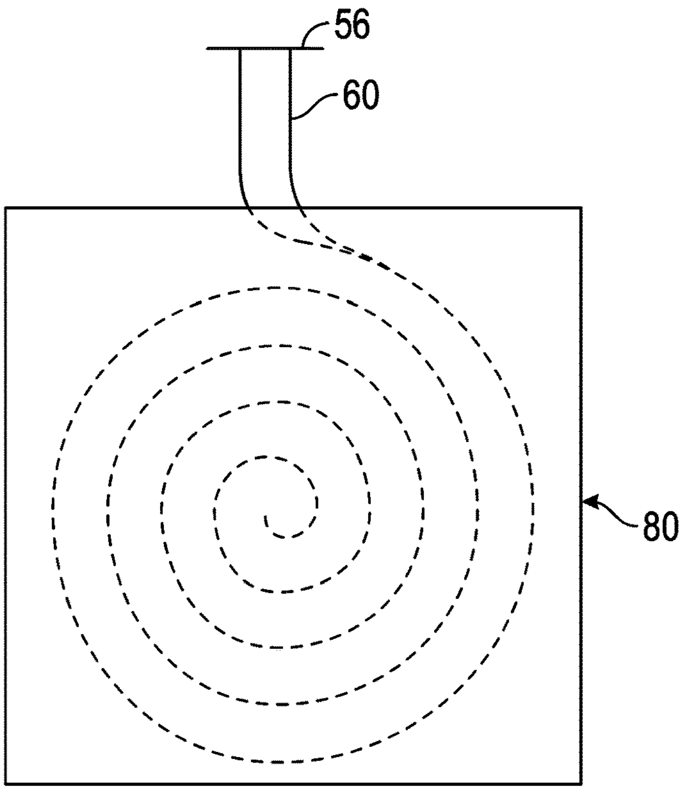
FIG. 16 shows a phantom view of a first method of storing the strap.
Figure 17:
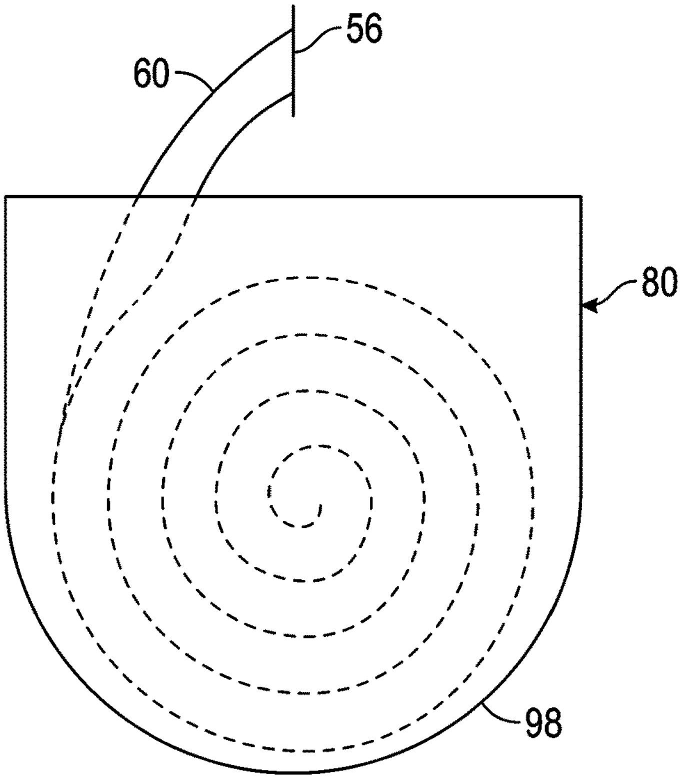
FIG. 17 shows a phantom view of the first method of storing the strap with a different pocket shape.

The size and shape of the pocket 80 depends on how the rolled/folded strap 60 will be stored. In one configuration, shown in FIGS. 16 and 17, the strap 60 is rolled clockwise, as in FIG. 16, or counterclockwise, as in FIG. 17, and slid into the pocket 80 such that one edge of the strap 60 abuts the torso outer surface 24. In this configuration, the pocket 80 is typically square. Alternatively, the bottom 96 of the pocket 80 is round, as in FIG. 17, so that it more closely conforms to the shape of the rolled strap 60.

Figure 18:
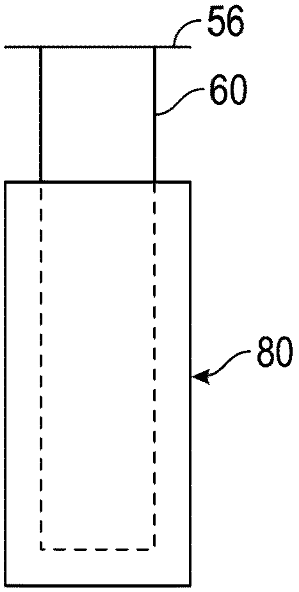
FIG. 18 shows a phantom view of another method of storing the strap.
Figure 19:
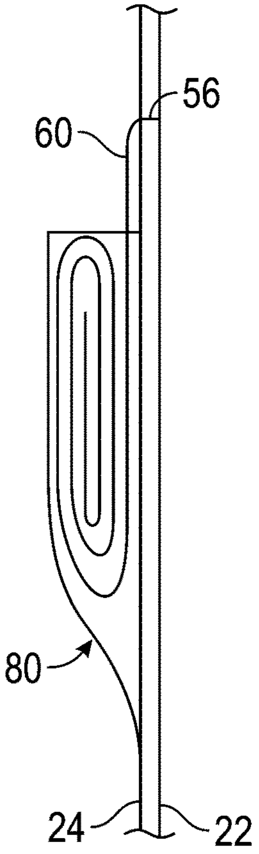
FIG. 19 shows a cross-sectional view of the method of storing the strap of FIG. 18.

In another configuration, shown in FIGS. 18 and 19, the strap 60 is rolled, flattened, and slid into the pocket 80 such that the strap 60 is a parallel to the torso outer surface 24. In this configuration, the pocket 80 is typically rectangular.

Figure 20:
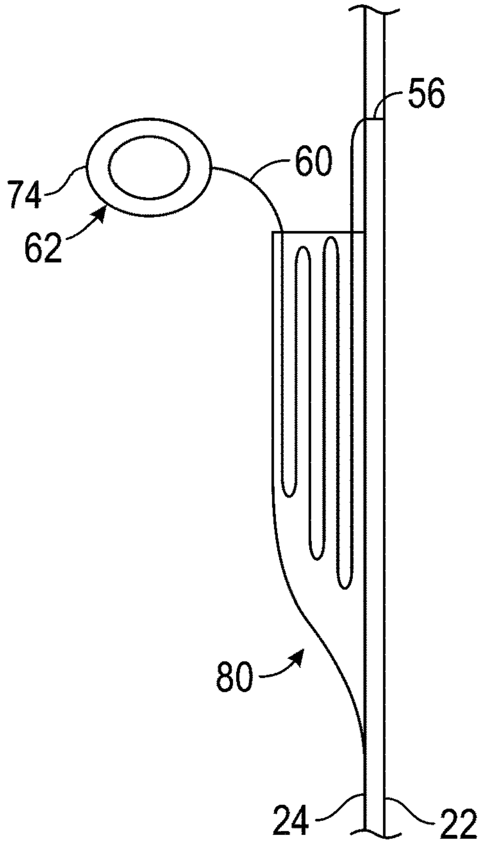
FIG. 20 shows a cross-sectional view of an alternate method of storing the strap.

Optionally, the end 62 of the strap 60 is left outside of the pocket 80, as in FIG. 20, so that the strap end 62 is more easily accessible. In this arrangement, the strap 60 is folded accordion style, rather than rolled, so that the strap end 62 will not be trapped inside the roll.

At least three different methods are contemplated for employing the harness 10 of the present invention. In the first, the strap 60 hangs down behind the wearer while facing the hazard. For a rescue, the rescuer merely grabs the strap 60 and drags or pulls the wearer headfirst away from the hazard. In this method, the pocket 80 is optional, and would be used for storage when the coat 10 is not in use.

In the second method, the strap 60 is stored in the pocket 80 with the handle 74 hanging out, as in FIG. 20. For a rescue, the rescuer grabs the handle 74, pulls the strap 60 completely out of the pocket 80, and drags or pulls the wearer headfirst away from the hazard.

In the third method, the pocket opening 82 is spaced below the slit 56 a distance that is long enough for the exposed section of strap 60 to be easily grabbed in a hurry. The present invention contemplates a minimum of six inches. For a rescue, the rescuer grabs the exposed section of strap 60, pulls the strap 60 out of the pocket 80, slides his hand to the strap end 62, and drags or pulls the wearer headfirst away from the hazard.

Thus, it has been shown and described a coat with an integral drag harness. Since certain changes may be made in the present disclosure without departing from the scope of the present invention, it is intended that all matter described in the foregoing specification and shown in the accompanying drawings be interpreted as illustrative and not in a limiting sense.

The invention claimed is:

1. A coat having material integrated therewith, the coat comprising:
- (a) a torso having a back with an inner surface and an outer surface, a right arm hole, a left arm hole, and a neck opening;
- (b) a slit in the center of the back below the neck opening and extending between the inner surface and the outer surface; and
- (c) a single strip of material providing a strap and a yoke, the single strip of material extending through the slit to the strap with a free end outside the torso back, and to the yoke following a path on the inner surface of the torso, the path running from the slit, around one arm hole, across the slit, around the other arm hole, and ending at the slit, wherein the yoke is secured to the inner surface along the entire path to integrate the single strip of material providing the yoke with the coat to maintain attachment of the yoke and the coat when in use;

wherein the yoke is secured to the inner surface by sewing.

2. The coat of claim 1 further comprising a pocket on the back for storage of the strap such that, when the strap is in the pocket, the strap is accessible from the outside surf ace.

3. The coat of claim 2 wherein the pocket is a patch sewn to the outer surface.

4. The coat of claim 2 wherein the pocket is attached to the inner surface and the strap is accessible through a horizontal slot extending between the inner surface and the outer surface.

5. The coat of claim 1 wherein the strip is a flat webbing.

6. The coat of claim 5 wherein the handle is a loop in the strap.

7. The coat of claim 5 wherein the handle is a ring attached to the strap.

8. The coat of claim 1 wherein the strip is a rope.

9. The coat of claim 1 wherein the free end of the strap has a handle.

10. The coat of claim 1 wherein the slit is vertical.

11. The coat of claim 1 wherein the slit is horizontal.

12. The coat of claim 1 wherein the yoke following the path running from the slit, around the one arm hole, across the slit, around the other arm hole, and ending at the slit forms a figure eight shape, wherein the yolk is sewn to the coat along the path.

13. The coat of claim 1 wherein the single strip of material is positioned around a torso and arms of a wearer when worn.

14. A coat having material integrated therewith, the coat comprising:
- (a) a torso having a back with an inner surface and an outer surface, a right arm hole, a left arm hole, and a neck opening;
- (b) a slit in the center of the back below the neck opening and extending between the inner surface and the outer surface; and
- (c) a single strip of flat webbing providing a strap and a yoke, the single strip of flat webbing extending through the slit to a strap with a free end outside the torso back, and to a yoke following a path on the inner surface, the path running from the slit, around one arm hole, across the slit, around the other arm hole, and ending at the slit, the yoke being sewn to the inner surf ace along the path such that the single strip of material providing the yoke is integrated with the coat, wherein the yoke maintains attachment to the coat when in use;

(d) a pocket comprising a patch sewn to the outer surface for storage of the strap; and wherein the yoke has three layers at the slit comprising a bottom layer coming through the slit, a middle layer crossing the slit, and a top layer as a secured end of the yoke, wherein the three layers are sewn to the coat so that the yoke maintains attachment to the coat when in use.

15. The coat of claim 14 wherein the free end of the strap has a loop.

16. The coat of claim 15 wherein the handle is a ring attached to the strap.

17. The coat of claim 14 wherein the slit is vertical.

18. The coat of claim 14 wherein the slit is horizontal.

19. A coat having material integrated therewith, the coat comprising:

(a) a torso having a back with an inner surface and an outer surface, a right arm hole, a left arm hole, and a neck opening;

(b) a slit in the center of the back below the neck opening and extending between the inner surface and the outer surface; and (c) a single strip of material providing a strap and a yoke, the single strip of material extending through the slit to the strap with a free end outside the torso back, and to the yoke following a path on the inner surface of the torso, the path running from the slit, around one arm hole, across the slit, around the other arm hole, and ending at the slit, wherein the inner surface and the yoke are secured along the path to integrate the single strip of material providing the yoke with the coat to maintain attachment of the yoke and the coat when in use;

wherein the yoke has three layers at the slit comprising a bottom layer coming through the slit, a middle layer crossing the slit, and a top layer as a secured end of the yoke, wherein the three layers are sewn to the coat so that the yoke maintains attachment to the coat when in use.

* * * * *